UNITED STATES PATENT OFFICE.

HENRY NOEL POTTER, OF NEW ROCHELLE, NEW YORK, ASSIGNOR TO GEORGE WESTINGHOUSE, OF PITTSBURGH, PENNSYLVANIA.

CARBOSILICON.

1,030,327.     Specification of Letters Patent.     Patented June 25, 1912.

No Drawing.     Application filed March 22, 1904. Serial No. 199,507.

*To all whom it may concern:*

Be it known that I, HENRY NOEL POTTER, a citizen of the United States, and resident of New Rochelle, county of Westchester, State of New York, have invented Carbosilicon, of which the following is a specification.

I have discovered that silicon carbid and heated silicon unite to form a tough, close-grained, hard, non-porous material of high specific electrical resistance and great inertness to oxidation at high temperatures. The material possesses other valuable properties and I have given it the name of carbosilicon. The material thus named is valuable for many purposes, notably as a heating resistance for electrical apparatus. It is also adapted to be used as an electrode for vacuum or vapor tubes for lighting or other purposes, as it appears to contain little or no occluded gas.

Carbosilicon does not resemble a chemical compound of definite proportion but is more like an alloy having properties different from its constituents but shading gradually at each extreme into the one or the other. It is not a mere mixture, as the two constituents lose their physical individuality. As an analogy, it may be said that the addition of silicon carbid to silicon affects the latter somewhat as the addition of iron carbid ($Fe_3C$ cementite) affects iron, making it better mechanically.

Carbosilicon may be produced by melting silicon in contact with silicon carbid. The latter may be given the shape of the completed article by pressing powdered silicon carbid and binder in a mold. It may then be brought into contact with molten silicon, whereupon silicon will be absorbed and the new material produced. It may also be produced by treating a mixture of silicon carbid and silica in an electric furnace. A mixture of one hundred (100) parts silicon carbid to fifty (50) parts silica will react and produce it. When the proportion of silica is too low the product does not flow readily and forms a sponge in the furnace instead of a compact mass.

A mixture of silicon carbid and silicon in the form of dry powders can be pressed into shape and baked into this new material, but such masses tend to chip apart in a peculiar and characteristic way, which would seem to indicate a powerful force seeking to aggregate the constituents in some manner so different from a heterogeneous mixture, as, in its formation to rupture the mass.

Carbosilicon can be attached by caustic alkalies and by a mixture of nitric and hydrofluoric acids. The silicon dissolves and insoluble silicon carbid remains. This serves as a quick method of analysis to determine the proportion of silicon carbid. Both silicon and silicon carbid, as at present produced, contain small quantities of impurities, for example, I have found traces of aluminum, calcium and iron present, but not in such quantities as to materially affect the product. By silicon carbid, I mean either the amorphous or crystalline modification, the latter being known as carborundum.

I claim as my invention:—

The process of producing carbo-silicon which consists in pressing powdered silicon carbid and a binding material into a compact form and then bringing it into contact with molten silicon.

Signed at New York, in the county of New York, and State of New York, this 14th day of March, A. D. 1904.

HENRY NOEL POTTER.

Witnesses:
    WM. H. CAPEL,
    GEORGE H. STOCKBRIDGE.